United States Patent
Schaefer et al.

(10) Patent No.: US 10,927,233 B2
(45) Date of Patent: Feb. 23, 2021

(54) STABILIZED PLASTICIZERS FOR THERMOPLASTIC POLYURETHANE

(71) Applicant: BASF SE, Ludwigshafen (DE)

(72) Inventors: Frank Schaefer, Stemwede Haldem (DE); Henning Wettach, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/115,285

(22) PCT Filed: Jan. 21, 2015

(86) PCT No.: PCT/EP2015/051067
§ 371 (c)(1),
(2) Date: Jul. 29, 2016

(87) PCT Pub. No.: WO2015/113874
PCT Pub. Date: Aug. 6, 2015

(65) Prior Publication Data
US 2017/0009054 A1    Jan. 12, 2017

(30) Foreign Application Priority Data

Jan. 30, 2014 (EP) .................................. 14153255

(51) Int. Cl.
| | |
|---|---|
| *C08K 5/11* | (2006.01) |
| *C08K 5/29* | (2006.01) |
| *C08K 5/00* | (2006.01) |
| *C08G 18/34* | (2006.01) |
| *C08K 5/10* | (2006.01) |
| *C08K 5/521* | (2006.01) |
| *C08J 3/18* | (2006.01) |
| *C08G 18/79* | (2006.01) |
| *C08G 18/32* | (2006.01) |
| *C08G 18/42* | (2006.01) |
| *C08J 5/00* | (2006.01) |

(52) U.S. Cl.
CPC ............ *C08K 5/11* (2013.01); *C08G 18/3206* (2013.01); *C08G 18/346* (2013.01); *C08G 18/4238* (2013.01); *C08G 18/797* (2013.01); *C08J 3/18* (2013.01); *C08J 5/00* (2013.01); *C08K 5/0016* (2013.01); *C08K 5/10* (2013.01); *C08K 5/29* (2013.01); *C08K 5/521* (2013.01); *C08J 2375/06* (2013.01)

(58) Field of Classification Search
CPC .......... C08K 5/11; C08K 5/29; C08K 5/0016; C08K 5/10; C08K 5/521; C08G 18/3206; C08G 18/346; C08G 18/797; C08G 18/4238; C08J 3/18; C08J 5/00
See application file for complete search history.

(56) References Cited

FOREIGN PATENT DOCUMENTS

| | | |
|---|---|---|
| DE | 43 18 979 A1 | 12/1994 |
| DE | 198 21 666 A1 | 11/1999 |
| DE | 10 2005 040 131 A1 | 3/2007 |
| EP | 0 134 455 A1 | 3/1985 |
| EP | 0 628 541 A1 | 12/1994 |
| EP | 1 108 735 A1 | 6/2001 |
| EP | 1 338 614 A1 | 8/2003 |
| EP | 1 556 433 | 7/2005 |
| EP | 1 138 706 B1 | 12/2010 |
| WO | 2010/125009 A1 | 11/2010 |

OTHER PUBLICATIONS

Hans Zweifel, et al., "Plastics Additives Handbook", Hanser Publishers, 5th Edition, Total 29 Pages,(2001).
International Search Report dated Apr. 13, 2015 in PCT/EP15/051067 Filed Jan. 21, 2015.

*Primary Examiner* — John E Uselding
(74) *Attorney, Agent, or Firm* — Oblon, McClelland, Maier & Neustadt, L.L.P.

(57) ABSTRACT

The present invention relates to a process for producing a thermoplastic polyurethane, comprising the provision of a composition Z(W) comprising at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and at least one ester selected from the group consisting of citric acid esters, acetyl citric acid esters, phthalic acid esters, benzoic acid esters, adipic acid esters, hydrogenated phthalic acid esters and phosphoric acid esters; and the subsequent addition of the composition Z(W) to a thermoplastic polyurethane or a reaction mixture for producing a thermoplastic polyurethane. Further, the present invention relates to a thermoplastic polyurethane obtainable or obtained by a process according to the invention and to the use of the composition Z(W) as plasticizer for thermoplastic polyurethanes. The present invention also relates to moldings comprising a thermoplastic polyurethane according to the invention.

11 Claims, No Drawings

STABILIZED PLASTICIZERS FOR THERMOPLASTIC POLYURETHANE

The present invention relates to a process for producing a thermoplastic polyurethane, comprising the provision of a composition Z(W) comprising at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and at least one ester selected from the group consisting of citric acid esters, acetyl citric acid esters, phthalic acid esters, benzoic acid esters, adipic acid esters, hydrogenated phthalic acid esters and phosphoric acid esters; and the subsequent addition of the composition Z(W) to a thermoplastic polyurethane or to a reaction mixture for producing a thermoplastic polyurethane. Further, the present invention relates to a thermoplastic polyurethane obtainable or obtained by a process according to the invention and to the use of the composition Z(W) as plasticizer for thermoplastic polyurethanes. The present invention also relates to moldings comprising a thermoplastic polyurethane according to the invention.

Plasticized thermoplastic polyurethanes are widely known and are described, for example, in DE 10 2005 040 131 or EP 1 338 614. Thermoplastic polyurethanes of this kind comprise at least one plasticizer. When selecting the plasticizer, it is to be ensured particularly that the product is compatible with the thermoplastic polyurethane, the plasticizer has a sufficiently good plasticizing effect and that the plasticizer does not bring with it a negative influence on, for example, resistance to water and other media.

The plasticizers used for thermoplastic polyurethanes (TPU) are often phthalates and benzoates for polyester-TPU or phosphates for polyether-TPU. Systems of this kind are disclosed, for example, in EP 1 556 433 or EP 0 134 455. Furthermore, known plasticizers are selected from the group of adipates, hydrogenated phthalates, fatty acids or citric acid esters, with the latter being disclosed, for example, in EP 1 108 735 or WO 2010/125009.

It is known from the prior art that pure citric acid esters have a very good plasticizing effect in thermoplastic polyurethanes. For example WO 2010/125009 discloses a corresponding plasticizer for thermoplastic polyurethanes. In this connection, however, pure citric acid ester has the disadvantage of a low thermal resistance, for example even at temperatures as arise during the production and the processing of these esters as well as the incorporation of these esters into thermoplastic polyurethane. At the described temperatures of, for example, up to 190° C., acetylbutyl citrate can sometimes thermally decompose in such a way that a considerable increase in the acid number is measurable. If a plasticizer damaged in this way is incorporated into thermoplastic polyurethane, this has a negative effect on the resistance of the plasticized thermoplastic polyurethane. This can lead to, for example, the hydrolysis resistance of a thermoplastic polyurethane plasticized in this way being considerably impaired.

Accordingly, it was an object of the present invention to provide plasticizers for thermoplastic polyurethanes which have adequate resistance to thermal degradation. It was a further object of the present invention to provide plasticizers for thermoplastic polyurethanes which have an adequate hydrolysis stability.

At the same time, the mechanical properties and the processability of the thus produced plasticized thermoplastic polyurethanes should be comparable with that of conventional products.

It was a further object of the present invention to provide production processes for thermoplastic polyurethanes using plasticizers of this kind.

This object is achieved according to the invention by a process for producing a thermoplastic polyurethane, comprising the steps
  (i) provision of a composition Z(W) comprising
    (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
    (b) at least one ester selected from the group consisting of citric acid esters, acetyl citric acid esters, phthalic acid esters, benzoic acid esters, adipic acid esters, hydrogenated phthalic acid esters and phosphoric acid esters;
  (ii) addition of the composition Z(W) to a thermoplastic polyurethane or a reaction mixture for producing a thermoplastic polyurethane.

The present invention relates to a process for producing a thermoplastic polyurethane comprising the steps (i) and (ii). In the process, according to step (i), a composition Z(W) is provided which has at least one carbodiimide, and at least one ester as defined above. According to step (ii), the composition Z(W) is added to a thermoplastic polyurethane or a reaction mixture for producing a thermoplastic polyurethane. In this connection, it is possible in the context of the present invention that the composition is added to a fully reacted thermoplastic polyurethane or to a reaction mixture for producing a thermoplastic polyurethane.

If the composition Z(W) is added to a reaction mixture, this can in principle take place at any stage in the production process of a thermoplastic polyurethane.

If the composition Z(W) is added to an essentially fully reacted thermoplastic polyurethane, this can take place for example by means of incorporation by compounding or incorporation by swelling.

According to a further embodiment, the present invention accordingly also relates to a process as described above where the composition Z(W) is added according to step (ii) to a thermoplastic polyurethane by means of incorporation by compounding or incorporation by swelling.

Surprisingly, it has been found that by means of the composition Z(W) according to the invention, a stabilization of the ester selected from the group consisting of citric acid esters, acetyl citric acid esters, phthalic acid esters, benzoic acid esters, adipic acid esters, hydrogenated phthalic acid esters and phosphoric acid esters is achieved through the addition of a carbodiimide-containing stabilizer, and the resulting increase in the acid number of the ester can be considerably reduced for the same thermal stress. The acid number serves here as a measure of the thermal degradation of the ester. The increased acid number simultaneously has a negative effect on the hydrolytic stability of the resulting plasticized thermoplastic polyurethane.

A further advantage of the systems according to the invention is also the considerably improved resistance to hydrolytic degradation. Thus, for example, a plasticized thermoplastic polyurethane using the composition Z(W) according to the invention has, according to the examples, a hydrolysis stability of 56 days. A thermoplastic polyurethane comprising a non-stabilized variant, by contrast, only has a hydrolysis stability of 35 days, according to the examples. As a result of the stabilization according to the invention, it is thus possible firstly to increase the thermal stability of an ester-based plasticizer. Secondly, as a result of the stabilization of the plasticizer, it is also possible to produce a plasticized thermoplastic polyurethane with considerably improved hydrolysis stability. As is evident from the examples, this effect is attributed to the order of addition according to the invention, i.e. a provision of the composition Z(W) and a subsequent addition to the thermoplastic polyurethane.

The process according to the invention for producing a thermoplastic polyurethane comprises the provision of a composition Z(W) comprising
(a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
(b) at least one ester selected from the group consisting of citric acid esters, acetyl citric acid esters, phthalic acid esters, benzoic acid esters, adipic acid esters, hydrogenated phthalic acid esters and phosphoric acid esters.

According to the invention, the composition Z(W) here can be obtained in all ways known to the person skilled in the art, for example by mixing the component. According to the invention, the mixing can take place by means of standard processes.

According to the invention, the composition Z(W) can be produced directly prior to addition to the thermoplastic polyurethane. In this connection, the production of the composition Z(W) in the context of the present invention involves the mixing of the components and a setting of the acid number. Depending on external conditions, for example storage temperature and mixing, the setting time here is up to 30 minutes. After this time, the composition Z(W) according to the invention is storage-stable and can also be further processed at a considerably later time with properties according to the invention.

According to a further embodiment, the present invention accordingly also relates to a process as described above where the production of the composition Z(W) involves the mixing of the components and a setting of the acid number.

Further, the present invention according to a further embodiment also relates to a process as described above where the addition of the composition Z(W) takes place according to step (ii) after the setting has concluded.

The composition Z(W) comprises at least one ester selected from the group consisting of citric acid esters, acetyl citric acid esters, phthalic acid esters, benzoic acid esters, adipic acid esters, hydrogenated phthalic acid esters and phosphoric acid esters. According to the invention, the composition Z(W) can also comprise mixtures of two or more of the specified esters.

According to the invention, suitable esters are those which have adequate compatibility with the thermoplastic polyurethane used and achieve a plasticizing effect. Furthermore, esters are suitable which can be processed under reaction conditions that are usually present during the synthesis and processing of thermoplastic polyurethanes, i.e. esters which have an adequate stability at a temperature in the range of up to 250° C.

A compatibility suitable according to the invention is, for example, in the range from 15 to 50%, where the compatibility of the ester with the thermoplastic polyurethane in the context of the present invention is determined by reference to the transparency of the overall system. Preferably, the overall system in the context of the present invention is transparent, i.e. a homogeneous mixture of the components is present.

In the context of the present invention, a reduction in the Shore hardness in the range from 3 Shore A to 35 Shore A, preferably in the range from 5 Shore A to 25 Shore A, for example in the range from 6 Shore A to 15 Shore A, is advantageously achieved by the plasticizing properties compared to a thermoplastic polyurethane without the addition of the composition Z(W).

Suitable esters are known per se to the person skilled in the art as plasticizers for thermoplastic polyurethanes.

Particularly preferably, the composition Z(W) comprises at least one ester selected from the group consisting of citric acid esters and acetyl citric acid esters.

Of suitability according to the invention are, in particular, plasticizer compounds based on citric acid esters. These can carry either no functional groups such as, for example, CITROFOL® B II, or else OH functions such as, for example, CITROFOL® B I or CITROFOL® A I.

Preferred esters are those of the general formula (I):

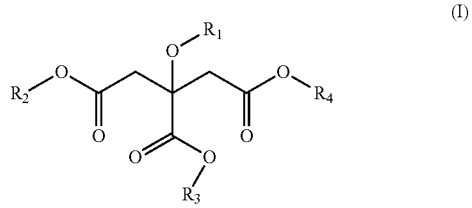

where
R1 is H or a carboxylic acid radical having 2 to 12 carbon atoms, preferably H or carboxylic acid radical having 2 to 6 carbon atoms;
R2, R3, R4 independently of one another are an alkyl radical having 2 to 12, preferably 2 to 6, carbon atoms.

According to a further embodiment, the present invention accordingly also relates to a process as described above where the composition Z(W) comprises at least one citric acid ester.

Further preferably, the composition Z(W) comprises at least one ester selected from the group consisting of triethyl citrate, tyltriethyl citrate, tri(n-butyl) citrate, acetyltri(n-butyl) citrate and acetyl(2-ethylhexyl) citrate.

The composition Z(W) further comprises at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides.

The carbodiimides used according to the invention can also vary within wide ranges. Suitable carbodiimides are described, for example, in EP 0 628 541, DE 43 189 79 A1, DE 198 21 666 A1 or EP 1 138 706 B1. Particularly suitable carbodiimides are described, for example, by the general formula (II).

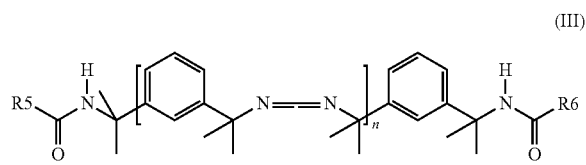

(III)

where n=1 to 20 and
R5 and R6 are methoxylated polyethylene glycol radicals of the formula: -(EO)$_m$-OCH$_3$ where m=1 to 20.

Further preference in the context of the present invention is given to aliphatic carbodiimides.

According to a further embodiment, the present invention accordingly also relates to a process as described above where the composition Z(W) comprises at least one carbodiimide selected from the group consisting of monomeric aliphatic carbodiimides, oligomeric aliphatic carbodiimides and polymeric aliphatic carbodiimides.

The molar ratio of added carbodiimide groups to the initial acid content of the ester used can vary in wide ranges and, according to the invention, is preferably in the range from 20:1 to 1:10, preferably 10:1 to 1:2.

According to a further embodiment, the present invention accordingly also relates to a process as described above where the molar ratio of added carbodiimide groups to the initial acid content of the ester used is in the range from 20:1 to 1:10.

The amount of composition Z(W) used is based on the total amount of thermoplastic polyurethane. According to the invention, this can vary within wide ranges, the composition Z(W) being used in accordance with the invention in amounts which is customary for plasticizers. For example, the amount of composition Z(W) based on the total amount of thermoplastic polyurethane is in the range from 1 to 50% by mass, in particular in the range from 2.5 to 40% by mass, preferably in the range from 5 to 35% by mass, and particularly preferably in the range from 7.5 to 30% by mass. If the composition Z(W) is added to a reaction mixture for producing a thermoplastic polyurethane, the amount of composition Z(W) used in the context of the present invention refers to the total amount of structural components used in the thermoplastic polyurethane.

According to a further embodiment, the present invention accordingly also relates to a process as described above where the amount of composition Z(W) based on the total amount of thermoplastic polyurethane is in the range from 1 to 50% by mass.

According to the invention, the composition Z(W) is added to a thermoplastic polyurethane or a reaction mixture for producing a thermoplastic polyurethane.

The thermoplastic polyurethanes used can likewise vary within wide ranges. Processes for producing thermoplastic polyurethanes are generally known. Preferably, the polyurethanes are produced by reacting (a) isocyanates with (b) compounds reactive towards isocyanates and preferably with (c) chain extension agents, optionally in the presence of (d) catalysts and/or (e) customary auxiliaries.

The aim below is to explain by way of example preferred starting components and processes for producing preferred polyurethanes. The components of (a) isocyanates, (b) compounds reactive towards isocyanates, (c) chain extension agents, and optionally (d) catalysts and/or (e) customary auxiliaries preferred by way of example in the production of these polyurethanes will be described below. The isocyanates (a), the compounds (b) reactive towards isocyanate and, if used, also the chain extenders (c) are also discussed as structural components.

Organic isocyanates (a) that can be used are generally known isocyanates, preference being given to aromatic, aliphatic, cycloaliphatic and/or araliphatic isocyanates, further preferably diisocyanates, preferably 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethyldiphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene diisocyanate-1,5,2-ethylbutylene diisocyanate-1,4-pentamethylene diisocyanate-1,5, butylene diisocyanate-1,4,1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexanediisocyanate, 1-methyl-2,4- and/or -2,6-cyclohexane diisocyanate and/or 4,4'-, 2,4'- and 2,2'-dicyclohexylmethane diisocyanate (H12MDI). Further preferably 2,2'-, 2,4'- and/or 4,4'-diphenylmethane diisocyanate (MDI), 1,5-naphthylene diisocyanate (NDI), 2,4- and/or 2,6-tolylene diisocyanate (TDI), hexamethylene diisocyanate (HDI), 4,4'-, 2,4'- and 2,2'-dicyclohexylmethane diisocyanate (H12MDI) and/or 1-isocyanato-3,3,5-trimethyl-5-isocyanatomethylcyclohexane IPDI, especially preferably 4,4'-MDI.

As compounds (b) reactive towards isocyanates it is possible to use generally known compounds reactive towards isocyanates, preferably polyesterols, polyetherols and/or polycarbonatediols, which are also summarized under the term "polyols", preferably of an average functionality of 1.8 to 2.3, preferably 1.9 to 2.2, in particular 2. The average functionality here indicates the number of groups in a mixture that are present on average per molecule and react with the isocyanate group.

Chain extension agents (c) that can be used are generally known aliphatic, araliphatic, aromatic and/or cycloaliphatic compounds. Suitable compounds are known to the person skilled in the art. Suitable compounds preferably have groups reactive towards isocyanates, such as e.g. alcohol or amine groups, preferably alcohol groups.

Suitable catalysts (d), which in particular accelerate the reaction between the NCO groups of the isocyanates (a), preferably of the diisocyanates and the hydroxyl groups of the structural components (b) and (c) are the tertiary amines customary and known according to the prior art, preferably triethylamine, dimethylcyclohexylamine, N-methylmorpholine, N1N'-dimethylpiperazine, 2-(dimethylaminoethoxy)ethanol, diazabicyclo-(2,2,2)-octane and similar as well as in particular organic metal compounds such as titanic acid esters, iron compounds, preferably iron-(MI) acetylacetonate, tin compounds, preferably tin diacetate, tin dioctoate, tin dilaurate and/or tin dialkyl salts, of aliphatic carboxylic acids, preferably dibutyltin diacetate, dibutyltin dilaurate or the like. The catalysts are usually used in amounts of from 0.00001 to 0.1 parts by weight per 100 parts by weight of compound (b).

Besides catalysts (d), in preferred embodiments customary auxiliaries (e) are also added to the structural components (a) to (c). Mention may be made, for example, of surface-active substances, flame retardants, germinating agents, oxidation stabilizers, lubricating and mold release aids, dyes and pigments, stabilizers, e.g. against hydrolysis, light, heat or discoloration, inorganic and/or organic fillers and reinforcing agents.

Further details regarding the aforementioned auxiliaries and additives can be found in the specialist literature, e.g. from Plastics Additive Handbook, 5th edition, H. Zweifel, ed., Hanser Publishers, Munich, 2001.

To adjust the hardness of the a polyurethane, the structural components (b) and (c) can be varied within relatively wide molar ratios. Molar ratios of component (b) to chain extension agents (c) to be used overall of 10:0 to 1:0.35, where the hardness of the polyurethane increases with increasing content of (c), have proven useful.

In a particularly preferred embodiment, the thermoplastic polyurethane has a characteristic number from 980 to 1200. The characteristic number is defined by the molar ratio of isocyanate groups in component (a) used overall in the reaction to the groups reactive towards isocyanates, i.e. the active hydrogens, of components (b) and optionally chain extenders (c).

The TPU production can be performed by known processes in a continuous manner, preferably using reaction extruders or the belt process according to one-shot or the prepolymer process, or in a discontinuous manner. According to the invention, preference is given to the one-shot process. In these processes, the components (a), (b) and optionally (c), (d) and/or (e) entering the reaction can be mixed in succession or at the same time as one another, in which case the reaction starts directly.

In the case of the extruder process, the structural components (a), (b) and optionally (c), as well as the components (d) and/or (e) are introduced into the extruder individually or as a mixture, and reacted preferably at temperatures from 100° C. to 280° C., further preferably at 140° C. to 250° C. The resulting TPU is extruded, cooled and granulated.

According to the invention, the composition Z(W) can be added during or after the production, for example together with the components (d) and/or (e).

According to the invention, preference is given to thermoplastic polyurethanes based on polyetherols or polyesterols or mixtures of polyetherols and polyesterols.

According to a further embodiment, the present invention accordingly also relates to a process as described above where the thermoplastic polyurethane is a thermoplastic polyurethane based on a polyesterol or a polyetherol.

In a particularly preferred embodiment, the thermoplastic polyurethane is based on an MDI as diisocyanate and a polyesterol and/or polyetherol, in particular a polyester of adipic acid with butanediol and/or ethylene glycol and/or methylpropanediol and/or propanediol and/or hexanediol or a polyether based on polyethylene oxide, polypropylene oxide, and polytetrahydrofuran or the mixtures thereof.

According to a further embodiment, the present invention also relates to a thermoplastic polyurethane obtainable or obtained by a process as described above. The thermoplastic polyurethanes according to the invention are characterized by an increased hydrolysis stability.

Further, the present invention also relates to the use of a composition Z(W) comprising
(a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
(b) at least one ester selected from the group consisting of citric acid esters, acetyl citric acid esters, phthalic acid esters, benzoic acid esters, adipic acid esters, hydrogenated phthalic acid esters and phosphoric acid esters;

as plasticizers for thermoplastic polyurethanes, particularly during the production of injection molded products, extrusion products or compounds.

According to a further aspect, the present invention also relates to moldings comprising a thermoplastic polyurethane obtainable or obtained according to a according to the invention or a thermoplastic polyurethane according to the invention. Furthermore, preference is given to injection molded products or extrusion products as moldings.

Further embodiments of the present invention can be found in the claims and the examples. It goes without saying that the features of the subject matter/processes/uses according to the invention specified above and explained below can be used not only in the combination stated in each case, but also in other combinations without departing from the scope of the invention. Thus, for example, the combination of a preferred feature with a particularly preferred feature, or of a feature that is not characterized further with a particularly preferred feature etc. is implicitly encompassed even if this combination is not expressly mentioned.

Exemplary embodiments of the present invention are listed below; these do not limit the present invention. In particular, the present invention also comprises those embodiments which arise from the back references stated hereinbelow and therefore combinations.

1. Process for producing a thermoplastic polyurethane, comprising the steps
   (i) provision of a composition Z(W) comprising
      (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
      (b) at least one ester selected from the group consisting of citric acid esters, acetyl citric acid esters, phthalic acid esters, benzoic acid esters, adipic acid esters, hydrogenated phthalic acid esters and phosphoric acid esters;
   (ii) addition of the composition Z(W) to a thermoplastic polyurethane or a reaction mixture for producing a thermoplastic polyurethane.

2. Process according to embodiment 1, where the composition Z(W) is added according to step (ii) to a thermoplastic polyurethane through incorporation by compounding or incorporation by swelling.

3. Process according to embodiment 1 or 2, where the thermoplastic polyurethane is a thermoplastic polyurethane based on a polyesterol or a polyetherol.

4. Process according to one of embodiments 1 to 3, where the composition Z(W) comprises at least one citric acid ester.

5. Process according to one of embodiments 1 to 4, where the composition Z(W) comprises at least one carbodiimide selected from the group consisting of monomeric aliphatic carbodiimides, oligomeric aliphatic carbodiimides and polymeric aliphatic carbodiimides.

6. Process according to one of embodiments 1 to 5, where the molar ratio of added carbodiimide groups to initial molar acid content of the ester used is in the range from 20:1 to 1:10.

7. Process according to one of embodiments 1 to 6, where the amount of the composition Z(W), based on the total amount of the thermoplastic polyurethane, is in the range from 1 to 50% by mass.

8. Thermoplastic polyurethane obtainable or obtained by a process according to one of embodiments 1 to 7.

9. Use of a composition Z(W) comprising
   (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
   (b) at least one ester selected from the group consisting of citric acid esters, acetyl citric acid esters, phthalic acid esters, benzoic acid esters, adipic acid esters, hydrogenated phthalic acid esters and phosphoric acid esters;
   as plasticizer for thermoplastic polyurethanes.
10. Molding comprising a thermoplastic polyurethane obtainable or obtained according to a process according to one of embodiments 1 to 7 or a thermoplastic polyurethane according to embodiment 8.
11. Molding according to embodiment 10, where the molding is an injection molded product, an extrusion product or a compound.
12. Process for producing a thermoplastic polyurethane, comprising the steps
   (i) provision of a composition Z(W) comprising
      (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
      (b) at least one ester selected from the group consisting of citric acid esters, acetyl citric acid esters, phthalic acid esters, benzoic acid esters, adipic acid esters, hydrogenated phthalic acid esters and phosphoric acid esters;
   (ii) addition of the composition Z(W) to a thermoplastic polyurethane or a reaction mixture for producing a thermoplastic polyurethane.
13. Process according to embodiment 12, where the production of the composition Z(W) involves the mixing of the components and a setting of the acid number.
14. Process according to embodiment 12 or 13, where the addition of the composition Z(W) according to step (ii) takes place after the setting has concluded.
15. Process according to one of embodiments 12 to 14, where the composition Z(W) according to step (ii) is added to a thermoplastic polyurethane by means of incorporation by compounding or incorporation by swelling.
16. Process according to one of embodiments 12 to 15, where the thermoplastic polyurethane is a thermoplastic polyurethane based on a polyesterol or a polyetherol.
17. Process according to one of embodiments 12 to 16, where the composition Z(W) comprises at least one citric acid ester.
18. Process according to one of embodiments 12 to 17, where the composition Z(W) comprises at least one carbodiimide selected from the group consisting of monomeric aliphatic carbodiimides, oligomeric aliphatic carbodiimides and polymeric aliphatic carbodiimides.
19. Process according to one of embodiments 12 to 18, where the molar ratio of added carbodiimide groups to the initial acid content of the ester used is in the range from 20:1 to 1:10.
20. Process according to one of embodiments 12 to 19, where the amount of the composition Z(W), based on the total amount of the thermoplastic polyurethane, is in the range from 1 to 50% by mass.
21. Thermoplastic polyurethane obtainable or obtained by a process according to one of embodiments 12 to 20.
22. Use of a composition Z(W) comprising
   (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
   (b) at least one ester selected from the group consisting of citric acid esters, acetyl citric acid esters, phthalic acid esters, benzoic acid esters, adipic acid esters, hydrogenated phthalic acid esters and phosphoric acid esters;
   as plasticizer for thermoplastic polyurethanes.
23. Molding comprising a thermoplastic polyurethane obtainable or obtained according to a process according to one of embodiments 12 to 20 or a thermoplastic polyurethane according to embodiment 21.
24. Molding according to embodiment 23, where the molding is an injection molded product, an extrusion product or a compound.

The examples below serve to illustrate the invention but are in no way limiting with respect to the subject matter of the present invention.

EXAMPLES

The examples according to the invention show that the effect according to the invention is not limited to the scavenging of carboxylic acids produced by thermal degradation, i.e. the stabilizing effect does not arise upon the addition of stabilizers with a basic effect which scavenge only the resulting acid.

1. Acid Number After Hot-Air Storage
   Citrofol® ATBC BII (acetyl tributyl citrate) is mixed with the amount of carbodiimide stated in each case. The initial carbodiimide fraction ("NCN fresh") of the mixture is measured.
   The samples are stored for 1 h at elevated temperatures and then the carbodiimide fraction is determined again. The results are given in Tables 1 and 2.
   In the case of 1 h at 170° C., 0.35% Elastostab® H01 are consumed.
   In the case of 1 h at 190° C., 1.60% Elastostab® H01 are consumed.

TABLE 1

| Dose of Elastostab® H01 [%] NCN content Elastostab® H01: 6.9% | NCN | | |
| --- | --- | --- | --- |
| | Fresh | 1 h at 190° C. | 1 h at 170° C. |
| 0.1 | 0.008 | ≤0.04 | ≤0.004 |
| 0.5 | 0.039 | ≤0.04 | 0.015 |
| 1.0 | 0.07 | ≤0.03 | 0.044 |
| 2.0 | 0.121 | ≤0.03 | |
| 2.5 | 0.16 | 0.05 | |

TABLE 2

| | Measured H01 fraction [%] | | |
| --- | --- | --- | --- |
| Dosage | Fresh | 1 h at 190° C. | 1 h at 170° C. |
| 0.1 | 0.12 | ≤0.06 | ≤0.06 |
| 0.5 | 0.56 | ≤0.06 | 0.22 |
| 1.0 | 1.01 | ≤0.04 | 0.64 |
| 2.0 | 1.75 | ≤0.04 | |
| 2.5 | 2.32 | 0.72 | |

2. Thermal Degradation

In the thermal degradation of acetyl tributyl citrate, carboxylic acids are released. This is evident from an increase in the acid number from initially 0.2 to 2.9 following storage of the pure plasticizer for 1 h at 190° C.

The addition of stabilizers with a basic effect cannot prevent the increase in the acid number following storage. In contrast to this, the addition of Elastostab® H01 (carbodiimide) can avoid the increase in acid number/limit it to a very low degree.

The results of comparative experiments 2.3 to 2.10 and of example 2.2 according to the invention are given in Table 3.

TABLE 3

| Example | Compound | Acid number originally [mgKOH/g] | Acid number 1 h/190° C. [mgKOH/g] |
|---|---|---|---|
| 2.1 | Citrofol ® ATBC BII Blank sample | 0.2 | 2.9 |
| 2.2 | Citrofol ® ATBC BII + 2.5% Elastostab ® H01 [=NCN content of 0.17%] | 0.2 | 0.4 |
| 2.3 | Citrofol ® ATBC BII + 0.1% trisisopropanolamine | 0.2 | 1.5 |
| 2.4 | Citrofol ® ATBC BII + 1.0% trisisopropanolamine | 0.2 | 2.1 |
| 2.5 | Citrofol ® ATBC BII + 0.1% Irganox ® 2000 | | 2.7 |
| 2.6 | Citrofol ATBC BII + 1.0% lrganox ® 2000 | | 2.6 |
| 2.7 | Citrofol ® ATBC BII + 0.1% trishydroxymethylamine | 0.2 | 2.4 |
| 2.8 | Citrofol ® ATBC BII + 1.0% trishydroxymethylamine | 0.2 | 6.4 |
| 2.9 | Citrofol ® ATBC BII + 0.5% Stabi mixture (*) | 0.2 | 1.4 |
| 2.10 | Citrofol ® ATBC BII + 0.5% calcium stearate | 0.2 | 1.8 |

(*) Stabi mixture: 45% Irganox ® 245; 45% Tinuvin ® 622; 10% Irgafoβ ® TNPP

3. Hydrolysis Stability

Example 3.1 shows a comparative example with hydrolysis-stable plasticizer, example 3.2 is a comparative example with Citrofol® BII without provision of the composition Z(W) and example 3.3 is an example according to the invention. The experiments relating to the hydrolysis stability are summarized in Table 4.

TABLE 4

| | | | Example 3.1 | Example 3.2 | Example 3.3 |
|---|---|---|---|---|---|
| Formulation | | | | | |
| Freeflex DPGA [fraction in %] | | | 15 | | |
| Citrofol ® ATBC BII [fraction in %] | | | | 15 | 15 |
| Fraction of Elastostab ® H01 in overall formulation [%] | | | 0.435 | 0.435 | 0.435 |
| Type of Elastostab ® H01 addition | | | Addition of TPU synthesis process | Addition of TPU synthesis process | Premixed with Citrofol ATBC BII |
| Test | Standard | Unit | Result | Result | Result |
| Standard | | | | | |
| Density | DIN EN ISO 1183-1A | g/cm³ | 1.187 | 1.177 | 1.175 |
| Shore A | DIN 53505 | | 71 | 72 | 73 |
| TS longitudinal | DIN EN | MPas | 40 | 38 | 40 |
| BE longitudinal | ISO 527 | % | 590 | 570 | 590 |
| TPS | DIN ISO 34-1, B (b | kN/m | 52 | 53 | 52 |
| Abrasion | DIN 53516 | mm³ | 36 | 18 | 29 |
| Exposure/artificial aging | | | | | |
| Hydrolysis resistance | 80° C., H2O vapor | | +56 d | 35 d | 56 d |
| TS longitudinal | | | 32 MPas | 24 MPas | 21 MPas |
| BE | | | 820% | 760% | 980% |

For the examples 3.1 to 3.3, a thermoplastic polyurethane based on polyesterol (butanediol adipate), MDI, and 1,4-butanediol was used. In all of the formulations of the examples, the total content of the hydrolysis protection agent Elastostab® H01 is 0.435% based on the overall formulation.

The mechanical properties of the thermoplastic polyurethanes obtained in all three experiments are comparable.

The comparison with the hydrolysis-stable plasticizer "Freeflex DPG-A" (example 3.1) shows that a hydrolysis stability of 56 days (56d) is possible (reference), which is desirable for technical applications.

If the Citrofol® Bll is introduced in the TPU synthesis in a normal way (comparative example 3.2), the hydrolysis stability of the material is reduced to a maximum of 35 days (35 d). If, by contrast, Citrofol® Bll is mixed as per the invention (example 3.3) beforehand with Elastostab® H01 and this mixture is added to the TPU synthesis, the hydrolysis stability can be increased again to 56 days (56 d).

The invention claimed is:

1. A process for producing a thermoplastic polyurethane, the process comprising:
   (i) providing a composition Z(W) comprising
      (a) at least one carbodiimide selected from the group consisting of monomeric aliphatic carbodiimides, oligomeric aliphatic carbodiimides, polymeric aliphatic carbodiimides, monomeric aromatic carbodiimides, oligomeric aromatic carbodiimides and polymeric aromatic carbodiimides, and
      (b) at least one ester selected from the group consisting of citric acid esters, acetyl citric acid esters, phthalic acid esters, benzoic acid esters, adipic acid esters, hydrogenated phthalic acid esters and phosphoric acid esters; and
   (ii) adding the composition Z(W) to a thermoplastic polyurethane or a reaction mixture for producing a thermoplastic polyurethane;
   wherein composition Z(W) is produced by a process which comprises:
      mixing components (a) and (b); and
      setting of the acid number of composition Z(W).

2. The process according to claim 1, wherein the addition of the composition Z(W) takes place in accordance with the adding (ii) after the setting has concluded.

3. The process according to claim 1, wherein the composition Z(W) is added in accordance with the adding (ii) to a thermoplastic polyurethane by incorporation by compounding or incorporation by swelling.

4. The process according to claim 1, wherein the thermoplastic polyurethane is a thermoplastic polyurethane based on a polyesterol or a polyetherol.

5. The process according to claim 1, wherein the composition Z(W) comprises at least one citric acid ester.

6. The process according to claim 1, wherein the composition Z(W) comprises at least one carbodiimide selected from the group consisting of monomeric aliphatic carbodiimides, oligomeric aliphatic carbodiimides and polymeric aliphatic carbodiimides.

7. The process according to claim 1, wherein a molar ratio of added carbodiimide groups to an initial acid content of the ester used is in the range from 20:1 to 1:10.

8. The process according to claim 1, wherein an amount of the composition Z(W), based on a total amount of the thermoplastic polyurethane, is in the range from 1 to 50% by mass.

9. A thermoplastic polyurethane obtainable or obtained by a process according to claim 1.

10. A molding comprising a thermoplastic polyurethane obtainable or obtained according to a process according to claim 1.

11. The molding according to claim 10, where the molding is an injection molded product, an extrusion product or a compound.

* * * * *